(12) United States Patent
Cardarelli et al.

(10) Patent No.: US 8,327,788 B1
(45) Date of Patent: Dec. 11, 2012

(54) MOORING PENDANT APPARATUS (76) Inventors: Venanzio Cardarelli, Plymouth, MA (US); Ronald A. Wolf, Plymouth, MA (US)

( * ) Notice: Subject to any disclaimer, the term of this patent is extended or adjusted under 35 U.S.C. 154(b) by 0 days.

(21) Appl. No.: 13/200,633

(22) Filed: Sep. 27, 2011

Related U.S. Application Data (63) Continuation-in-part of application No. 13/199,248, filed on Aug. 24, 2011.

(51) Int. Cl.
*B66C 1/36* (2006.01)

(52) U.S. Cl. .............. 114/230.26; 114/221 R (58) Field of Classification Search .......... 24/599.1, 24/599.4, 599.6, 600.9, 599.8; 294/191, 294/175, 26, 82.19, 82.1; 114/221 R, 230.1, 114/230.2, 230.3, 230.25, 230.26
See application file for complete search history.

(56) References Cited

U.S. PATENT DOCUMENTS

| | | | |
|---|---|---|---|
| 653,021 A | 7/1900 | Hamilton | |
| 2,492,991 A * | 1/1950 | Hanna | 24/599.6 |
| 4,595,223 A | 6/1986 | Hawie | |
| 5,243,926 A | 9/1993 | Wright et al. | |
| 5,301,628 A | 4/1994 | Daskalides | |
| 5,381,749 A | 1/1995 | Larson | |
| 5,398,634 A | 3/1995 | Eagan | |
| 5,538,303 A | 7/1996 | Dunham | |
| 5,634,421 A | 6/1997 | Velarde | |
| 6,273,017 B1 | 8/2001 | Griffin | |
| 6,363,876 B1 | 4/2002 | Blake | |
| 6,390,009 B2 | 5/2002 | Brown et al. | |
| 6,450,558 B1 | 9/2002 | Ringrose | |
| 7,089,877 B1 | 8/2006 | Hay | |
| 7,096,813 B1 | 8/2006 | Luck | |
| 7,712,804 B2 | 5/2010 | Leyden et al. | |
| 7,757,360 B1 | 7/2010 | Hong | |

\* cited by examiner

*Primary Examiner* — Edwin Swinehart
(74) *Attorney, Agent, or Firm* — D. Michael Burns (57) ABSTRACT

A mooring pendant apparatus for releasably coupling and decoupling a boat. The apparatus having a clip comprising hook and ring sections, with an opening therebetween defining a mouth. A spring loaded movable arm tension biased such that the mouth is kept closed, and it only opens upon activation by a boater pulling on a cable. A functional retractor arm for exerting a greater force on the movable arm than exerted by the internal spring such that the clip opens upon the boater pulling on a cable line. The mooring pendant apparatus operates as an extension of the boater's arm, and it can be utilized either by keeping the apparatus on the boat or leaving it connected to the mooring line and also to the mooring ball.

21 Claims, 5 Drawing Sheets

MOORING PENDANT APPARATUS

CROSS-REFERENCE TO RELATED APPLICATIONS

This application is a continuation-in-part of co-pending U.S. patent application Ser. No. 13/199,248 filed Aug. 24, 2011, the disclosure of which is incorporated by reference herein in its entirety.

FIELD OF THE INVENTION

This invention relates to an apparatus for releasably coupling and decoupling a clip to facilitate mooring a boat. More specifically, the apparatus allows for easier attachment of a mooring line to the bow of a boat.

BACKGROUND OF THE INVENTION

Pleasure boats, such as yachts and small boats, are often moored to either a dock cleat or a mooring buoy. The mooring line is tied around the dock cleat or through a mooring ring on a buoy. Preferably the mooring line is tied to a ring or eye member that is found on the bow of the boat. Because of the difficulty in securing a mooring rope to a relatively remote eye member, such as one found on the bow of a boat, the boater often neglects this procedure and only ties the boat to the cleats on the top surface of the boat. The difficulty created in trying to tie the rope to the buoy ring may be just as hard because the boater must reach down for the buoy and then often must pull it up to tie the line. If the mooring line cannot be pulled up, due to factors such as weight or tension in its anchor line, a second person is usually required. The problem encountered in trying to tie a mooring rope to the ring on the bow of a boat is usually due to the awkward position in which most bow rings are located. Reaching over and trying to reach the bow ring may be very hazardous to a boater, especially in rough waters. An unassisted boater may even find it impossible to moor his boat. It may be especially difficult to attach and detach a tie line to a mooring buoy or a boat bow ring or eyelet, in situations where a boat is not small enough to permit the user to reach down and manually fasten or unfasten the clip. Also, tying the mooring line to cleats on the deck of the boat creates chafe which can weaken and eventually cause failure of the mooring line. And, with more boats being built with pop-up or pull-up cleats there is the problem of failure from the constant stress of the mooring line. When the freeboard is large, the boatsman must use a long boat hook or gaff to reach down and snag the mooring line and lift it up to height where he can manually snap or unsnap the clip from the buoy or bow eye member.

Remote control attachment assemblies are commercially available and such assemblies usually comprise a slide member designed to be attached to a conventional elongated boat hook and then the hook is retained in an open position. This enables the open hook to engage the eye member of the mooring buoy or bow ring. Such assemblies are often difficult to use. The present invention has found that the type of devices which are generally considered the easiest to operate are those employing a long rod which acts as an extension of the boater's arm and wherein the opening and closing of the clip by a remote means eases the burden of the procedure.

SUMMARY OF THE INVENTION

The present invention overcomes the problems outlined above and provides a safe and convenient clip for docking a boat to a mooring structure with the aid of a mooring pendant apparatus. The apparatus releasably couples or decouples to an eyelet on the bow of the boat or to a buoy. The apparatus includes a clip that may open and close for attachment or release. The clip comprises an integral hook and ring which define a mouth therebetween. The hook section includes an attachment hook which accommodates a movable arm having an upper bridge section, which is biasly forced into the attachment hook by an internal spring located in the movable arm and therein exerts a tension on the bridge section to keep the clip in a closed position. The ring section includes an access of rotation hole which provides an anchoring position for a functional retractor lever, which includes a pair of right and left lower and upper arm sections, the lower and upper arms forming a variable angular deviation in relationship to each other while maintaining the arms in a bowed position. The retractor lever also has a curved contact section that is in functional engagement with the movable arm, and a leg section extending downwardly and which has an extension piece located at a distal end that frictionally fits with great bias into the access of rotation hole of the ring section to create leverage for the retractor lever. A central rod has a first end connected to the ring section of the clip and an opposing end containing a displaced eyelet, which has an opening for connection to a mooring rope. A cable is attached to the retractor lever for activation of the apparatus. The cable passes through a cable guide and then is secured to movable handle and is then secured to a fixed handle wherein a boater may pull on the movable handle with sufficient force to overcome the locking tension placed by the internal spring on the movable arm, therein opening the clip, which may then be closed by releasing the pull on the cable.

An embodiment of the invention utilizes a three sleeved attachment for placement over the movable arm, the attachment having a large inner sleeve friction-fitted over the movable arm and two smaller sleeves integrally connected on opposing sides of the attachment. There is no access of rotation hole in this embodiment. The functional retractor lever is secured to the clip by a pair of leg sections abruptly extending downward, each leg section friction-fitted into one of the smaller sleeves of the attachment. An external rod is connected to both the hook and ring sections of the clip, preferably by welding. The boater activates this embodiment in similar fashion to the preferred embodiment which is by pulling on the cable.

Another embodiment of the invention employs an innovative intermittent triple function external rod system having means for connecting a first end of the rod to both, the hook and ring sections of the clip. The system is made up of three intermittent sections, a first section for stabilizing both the mooring line and the cable, a second section serving as a connector between the first section, and a third section for stabilizing the mooring line and cable while providing a gripping handle for the boater. This embodiment uses a pull ball to activate the cable line to open and close the mouth of the clip.

While many other materials may be used, the clip, the rods and displaced ring of the mooring pendant apparatus are preferably formed out of stainless steel or brass and also may be cast or forged. When not cast the rods are integrally connected to the clip by welding. The cable is preferably formed from aircraft cable or polyvinylchloride coated steel in order to cope with the harsh conditions of water and weather. The displaced eyelet may be expanded to include multiple eyelets, of various configuration arrangements and shapes, for attachment of multiple mooring ropes, and may be affixed to the mooring line or may be connected at the time of use, thus keeping it on board the boat as opposed to keeping it connected to the mooring line and mooring ball.

BRIEF DESCRIPTION OF THE DRAWINGS

FIG. 4b is a top pictorial view of the functional retractor lever of the alternative embodiment shown in FIGS. 3 and 3a.

DETAILED DESCRIPTION OF THE INVENTION

Preferred embodiments of the invention will now be described with reference to the Figures. Some terms used in the description and the appended claims are defined below.

Figure 1:
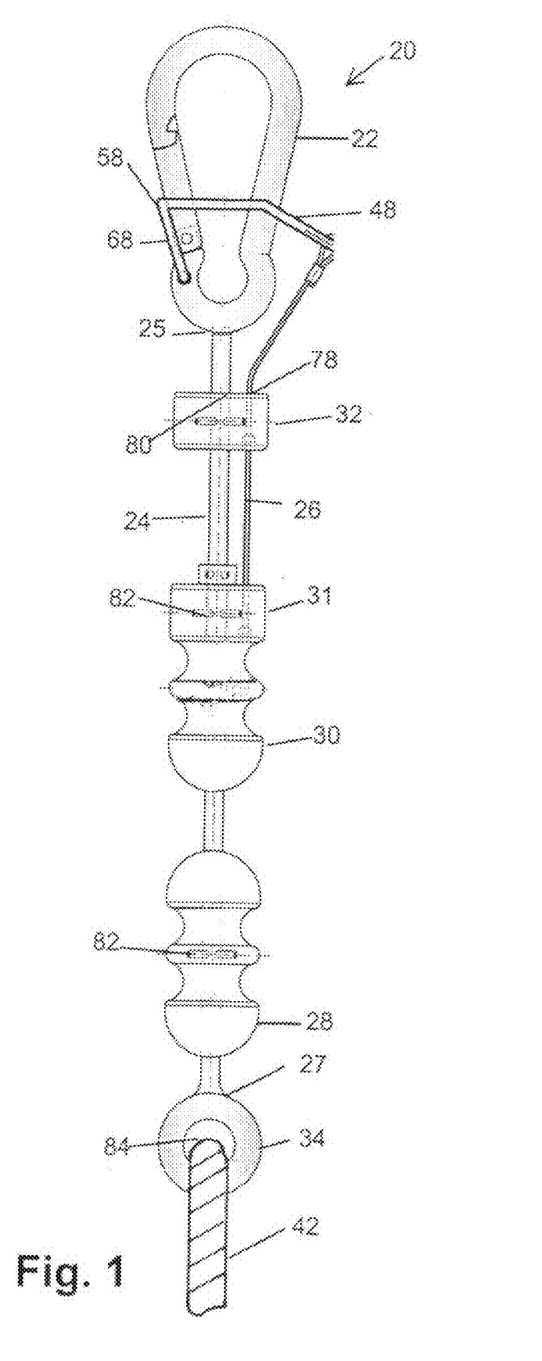
FIG. 1 is an elevational front view of an apparatus for mooring a boat, according to the present invention, and is shown in a closed position.
Figure 1A:
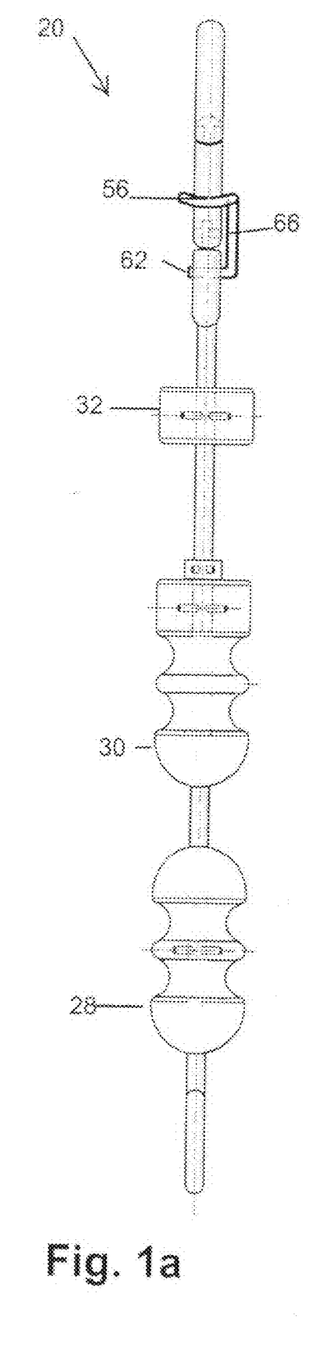
FIG. 1a is an elevational left side view of the apparatus of FIG. 1.

Referring to FIG. 1, the illustrated mooring pendant apparatus 20 is comprised of the following portions: a clip 22; a central rod 24; a cable 26 that when pulled or released controls the clip 22; handles, both a fixed handle 28, and a movable handle 30; a cable guide 32; and a displaced eyelet 34. The pendant apparatus 20 facilitates the placement and removal of the clip 22 from a boat ring (not shown) or a mooring ball (not shown). The clip 22 connects to the boat ring and/or to a mooring ball through the medium of a mooring line 42 (typically a rope) for the proper securing of the watercraft while in the water. The boater may opt to keep the apparatus onboard and connect to the mooring line, depending on the connectivity design chosen for that particular mooring line. The present apparatus 20 aids the boater in attaching the clip 22 to the boat ring/eyelet that is located on the bow of the boat, and which is often in a very precarious place to reach. In the boating industry, the design and location of boat rings were carefully engineered for function, and not convenience, therefore they are usually placed for an attachment site which is closer to the surface of the water. This design inherently reduces stress by lowering the center of gravity and rotation and by utilizating the framework of the boat itself to handle stress. The use of the present invention not only helps the boater with the ease of placement and removal of the clip 22 but also aids in the proper stabilization of the boat when moored.

The present invention uses one of the more common commercially available clips and then alters it in a most novel manner. As best illustrated in FIGS. 1, 2a to 2c, the clip 22 is comprised of: a hook section 36 and an integral ring section 38 that has a central opening 40 in which the mooring line 42 may optionally be tied; a movable arm 44 for opening and closing a mouth 67 of the clip 22; access of rotation hole 46 defined in the ring 38 at a unique site for anchoring the functional retractor lever 48 which controls the motion of the movable arm 44. The retractor lever 48 (best shown in FIG. 4a) is comprised of: a looped section 50 connected to the pull cable 26 (discussed below); a pair of lower and upper arm sections, a left lower section 54 and a left upper section 56 and a right lower section 55 and a right upper section 57 each of which forms an angular deviation in relationship to each other, and it is important to note that these angular deviations can be varied. There is included a curved functional contact section 58 for engaging the movable arm 44 when activation is required to open or shut the clip. The curvature is a critical concept as the functional contact section 58 will have a tendency to ride up on the front facing of the movable arm 44. This curvature design allows the contact section 58 to trail the arm movement and therefore not override the extent of the movable arm 44 when it is in its most open position. It also serves as a safety mechanism because upon releasing the functional retractor lever 48, the movable arm 44 is allowed to return to its closed position and the functional contact section 58 will lower itself to its original starting position. A leg section 68 extends in a downwardly direction and has at a distal end an extension piece 62 that frictionally fits with great bias into the axis of rotation hole 46, therein creating a leveraging anchor for the retractor lever 48. The movable arm 44 of the apparatus has an upper bridge section 64 that snap-locks into an attachment hook 66 on the hook section of the clip 22 to close it. An internal spring 49 creates the necessary tension to biasly hold the movable arm 44 in the closed position. The location for the access of rotation hole 46 was selected on the ring section 38 at a site as to not alter the clip's ability to function. The site herein was chosen to allow insertion of the extension piece 62 which creates an anchor for the retractor lever 48. Since the movable arm 44 of the clip has an internal spring 45 located within it, holes could not be placed within its' length. If such were done, then the clip would be destroyed and de-activated.

As previously stated, the leg section 68 of the retractor lever 48 has an extension piece 62 that is inserted into the access of rotation hole 46. This is the point of rotation for the retractor lever 48. When activated by pulling on the cable 26, the curved functional contact section 58 engages the movable arm 44, therein causing it to rotate inwards and thus opening the clip. By curving the functional contact section 58 the lower edge is placed in contact with the movable arm 44 and there is less chance of it coming too close to the end of the movable arm. The functional contact section 58 could also be straight rather than curved but curved is preferred thereby allowing the contact section 58 to go deeper. There is concern that when the mooring line 42 is attached at the ring section 38, and not the displaced eyelet 34, then the motion of the functional lever 48 could interfere with the mooring line. To overcome this potential problem, the functional lever is designed such that the left and right upper and lower arm sections are bowed outwards in respect to each other therefore avoiding any such contact. This concept is shown on FIG. 2c.

As previously stated, the pair of lower and upper arm sections, the left lower 54, the left upper 56, the right lower 55, and the right upper 57, form a variable angular deviation in relationship to each other, but it is not a definitive angle, it may be varied. The angle of curvature is somewhat due to the center of rotation around the access of rotation hole 46. The lower sections 54 and 55 can be lowered further by bending the line of demarcation between the lower and upper sections, or one could curve the upper sections, which would subsequently bring the lower sections closer to the center of the clip.

A first end 25 of the central rod 24 is preferably integrally attached to the ring 38 by welding, but other conventional means could be employed without infringing upon the integrity of the apparatus. The central rod 24 extends first through the cable guide 32, then through the movable handle 30, and through the fixed handle 28 and finally a second end 27 of the central rod 24 attaches to a displaced eyelet 34. The displaced eyelet 34 having an opening 84 defined therein for tying a mooring rope/line 42. For securing and controlling the cable 26, the cable guide 32 is provided, wherein this cable guide 32 offers the least angulation for the pull of the retractor arm 48. The guide 32 has a beveled conduit 78 for accepting the cable 26, and the bevel edge of the conduit allows for a minimization of the resistance therein. There is also a channel 80 defined in the center section of the guide for accepting the central rod 24, and multiple threaded holes 82 for insertion of inset screws (conventional screws therein not shown) to keep the guide attached to the rod.

The mooring line 42 referred to above is usually a strong and sturdy rope. While the instant invention prefers the mooring line to be connected to the displaced eyelet 34, it can also be placed on the ring 38, although on the ring 38 creates a tight fit, and subsequently making it rather difficult to control both the rope and the clip 22. The present invention envisions using the displaced eyelet 34 to affix the mooring line and yet still having the ability to consider the floating of the apparatus when it is not connected to the bow ring on the boat. If the mooring pendant apparatus 20 does not float, then it needs to be placed on or near the mooring ball rather than risk having it sink. When in use the mooring pendant apparatus 20 is connected to the bow ring and serves as an extension of the user's arm. When the mooring line and apparatus 20 are kept in the boat, the connectivity is usually made to the displaced ring 34 and then the boater connects the apparatus 20 to the bow ring. A second line is usually connected to one or more of the cleats on the boat and depending on the length of the central rod 24, the pendant apparatus 20 can be used to retrieve the mooring line 42. The length of the pendant apparatus 20 is a variable based on how much a boater can handle. Since it is an extension of one's arm, reaching and securing the line to the bow ring is made slightly easier, provided that the apparatus is kept within a reasonable weight.

As described already, the movable arm 44 is the active part of the clip 22, as this is where the tension is created as a result of the internal spring 49. This is the functional component of the clip, since by pulling the cable 26, the mouth of the clip 22 opens, and by releasing the cable 26, the mouth closes.

The ring 38 section of the clip 22 serves three functions. First, it can house the mooring line 42, although our preferred housing site as previously stated, is at the displaced eyelet 34 site. Secondly, because a specific location was chosen on the ring 38 to place an access of rotation hole 46 (a location which will not possibly effect the integrity of the clip 22), the open ring structure is hopefully maintained because it allows for connection to the mooring line, and yet still is in contact with the retractor lever 48 for easy opening and closing. If the apparatus is cast, and the center area of the ring section is subsequently filled solid, such that there would be no central opening 40 in the ring 38 to tie the mooring rope, then the inventive concept still will exist as long as the ring shape is maintained. And thirdly, the importance of the ring structure is that when a tension is created resulting in the bridge section 64 of the movable arm 44 locking within the hook 66 of the clip 22, the access of rotation hole 46 provides an anchor for the retractor lever 48 to activate the movable arm 44.

The present invention preferably has the mooring line 42 tied to the displaced eyelet 34. In this design the mooring line is thus displaced away from the clip 22 to avoid the tight spacing if it were tied to the ring 38 on the clip 22, and also so that it cannot interfere with the function of the movable arm 44 or retractor arm 48. This design also displaces the weight of the mooring line to an area further back, thus creating better leverage. While any geometric configuration or arrangement for the displaced eyelet ring may be used, such as a pear shaped design which could offer more room for the mooring line, or a large oval or large triangular form, the line angles must be round to avoid chafing when the mooring line is in motion. As previously stated, the displaced eyelet 34 may also include a plurality of rings, therein allowing for more than one mooring line to be connected.

The central rod 24 serves as an extension of one's arm, and may be of any length or diameter or geometric configuration as well. The handles, fixed 28 and movable 30, require the channel 80 to be of a size and shape to accommodate the central rod 24. When a circular cross-sectional rod is used there may be a tendency for the movable handle to rotate on the rod. For this reason a preferred embodiment can have a hexagonal or oval shaped central rod, and the rod may also have curvatures, without taking away any of the inventive concepts. It is the location of the cable guide 32 which limits the un-wanted rotation of the cable line.

Figures 2, 2B:
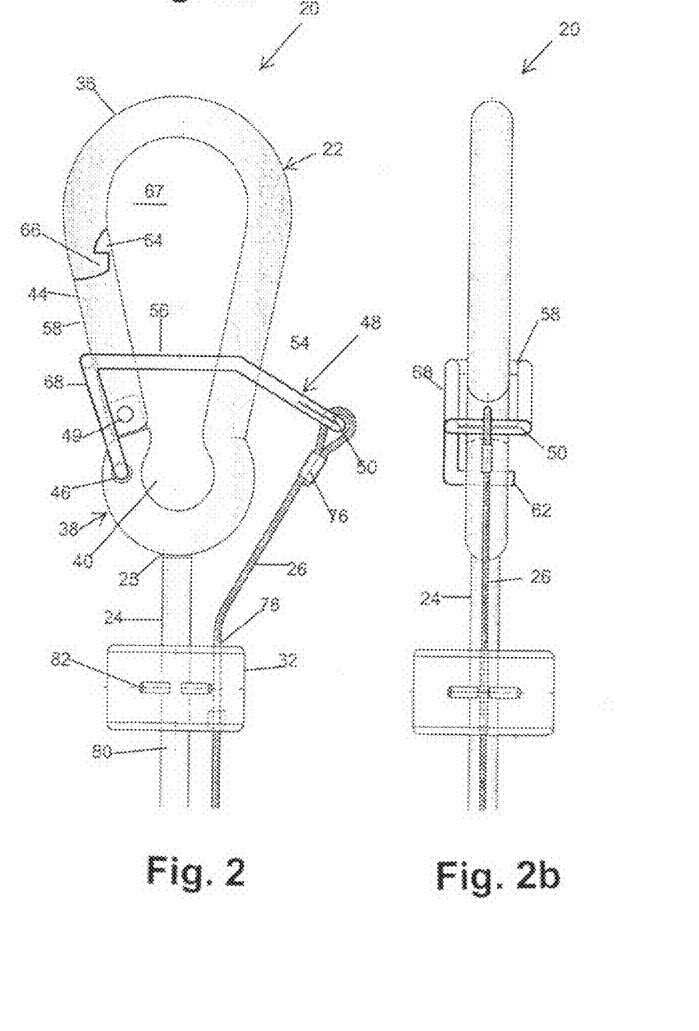
FIG. 2 is an elevational front view of the clip part of the apparatus with the cable guide containing the central rod and cable.
FIG. 2b is a right elevational view of FIG. 2.
Figure 2A:
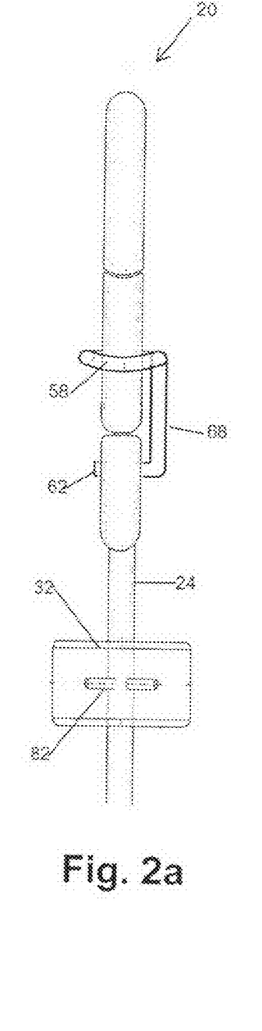
FIG. 2a is a left elevational view of FIG. 2.
Figure 2C:
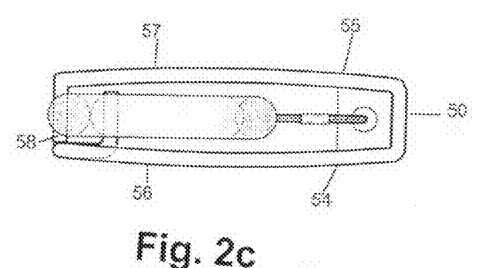
FIG. 2c is a top plan view of the apparatus of FIG. 2.

As illustrated in FIGS. 1 and 2, the cable 26 is maintained within the confines of the cable guide 32, which helps to place it in a place where it is alongside the rod 24 and does this while the cable is being pulled inward and close to the central rod 24. It is at this point wherein the cable has the most tension placed on it. A conduit 78 at the entrance of the cable guide is beveled to allieviate chafing. The cable enters the guide 32 and exits the guide such that it is held in close alignment with the central rod 24. In the preferred embodiment the cable is exposed and only covered while in the conduit 78 and has its distal end affixed within the movable handle 30.

The retractor lever 48 forms part of a unique design of the present invention. As previously cited, it has two arm sections that are bowed in relationship to each other. The retractor arm 48 may be bent such that it is lowered it and therefore in closer proximity to the rod 24, however the angular deviation is still a factor in the exertion necessary for the pull cable 26. The contact section 58 of the retractor arm 48 maintains functional contact with the movable arm 44. This provides the functional aspect of the invention, wherein when the cable 26 is pulled, it exerts a rotational force about the access of rotation hole 46, thereby applying pressure on the movable arm 44 releasing it from the hook 66 and thus opening-up. The reverse of this action is such that upon releasing the pull on the movable handle 30, the cable tension is lessened thereby closing the clip 22. It is shown on FIGS. 2 and 2a, that the contact section 58 embraces both, the left and right arms of the retractor lever, and when activated the pull is evenly shared by both arms, because there isn't any deviation or deformation caused by an uneven pull. This is best achieved by controlling the angle formed by the upper 56, 57, and lower arm sections 54, 55 of the retractor arm 48. The angular deviation between the upper 56, 57, and lower arm sections 54, 55 may be varied The cable 26 can be made of any material having the strength and capability to handle salt water, to minimize elongation under wet conditions, as well as handling the effects of warm or cold temperatures. Materials may include rope or aircraft cable, but any wire, cable or rope may be substituted provided it can cope with the harsh environment without any elongation problems. Aircraft cable is preferred for the present invention for it has shown excellent controlled elongation under wet conditions. If stainless steel is used, it is better if coated so that it is not be abrasive to the system or to the grasp of the user's hands. Lack of elongation is critical as any elongation of the cable would affect the distance in which the movable arm opens and closes, as the distance of the movable handle pull is essentially measured. As previously stated, the cable 26 is attached to the looped section 50 of the retractor arm 48 and is secured with a ferrule clip 76. The cable 26 freely moves through the beveled conduit 78 of the cable guide 32, without hindrance or resistance, and connects to the movable handle 30, wherein it is secured internally. The distance between the fixed and movable handles is established by how much the movable handle 30 has to be pulled towards the fixed handle 28 in order to manipulate the movable arm 44 to completely open the mouth of the clip. Therefore, it is critical that the cable maintain its length without any elongation.

The fixed handle 28 has a central elevated portion which contains a plurality of threaded holes 82 (preferably four) for insertion of a like number of inset screws (not shown) which connect the fixed handle 28 to the central rod 24, and they are hidden and non-abrasive to the user. These inset screws preferably will be covered by either rubber or plastic caps to protect them from the elements. Both the fixed, and movable handles 28, 30, and the cable guide 32 were designed such that their convex outermost parts act as bumpers when the hull is in a flax tide, and therein allow the system to come into contact with the bow of the boat. The fixed handle 28 functions to eliminate the need of the user to grasp and pull the movable handle 30 as well as the central rod 24 as a point of fixation. The present invention allows for a finger and hand grasp rather than just a hand grasp that may not be totally comfortable. Another benefit of the fixed handle 28 is not just in providing comfort, but it also allows the user to finger hold the clip 22 in the open position and therein approach the bow ring from different angles and individual preferences. The center channel 80 is defined in the cable guide 32, movable handle 30 and fixed handle 28 though the channel 80 defined in the movable handle 30 is slightly larger than the channel 80 defined in the fixed handle 28 or the cable guide 32. This allows it to have an ease of movement on the pull cable as varying temperatures may have an effect on handle materials such as plastics, metals or rubber. It is preferred that the handles and guides be molded in half sections and then joined together around the central rod 24. The fixed handle 28 and the movable handle 30, have the same basic parts, except that the inset screws of the fixed handle 28 secure it integrally to the central rod 24. The movable handle 30, which is designed to slide along the central rod 24 also has an extension 31 in its top side to limit any possible warble of the handle once the pull is initiated. The set screws, as used with both the cable guide 32 and fixed handle 28, have the function of securing each of them to the central rod 24, while the set screws used in the movable handle 30 are mainly utilized for fixating the two halves of the handle and are not to make it integral with the central rod 24.

Figures 3, 3A:
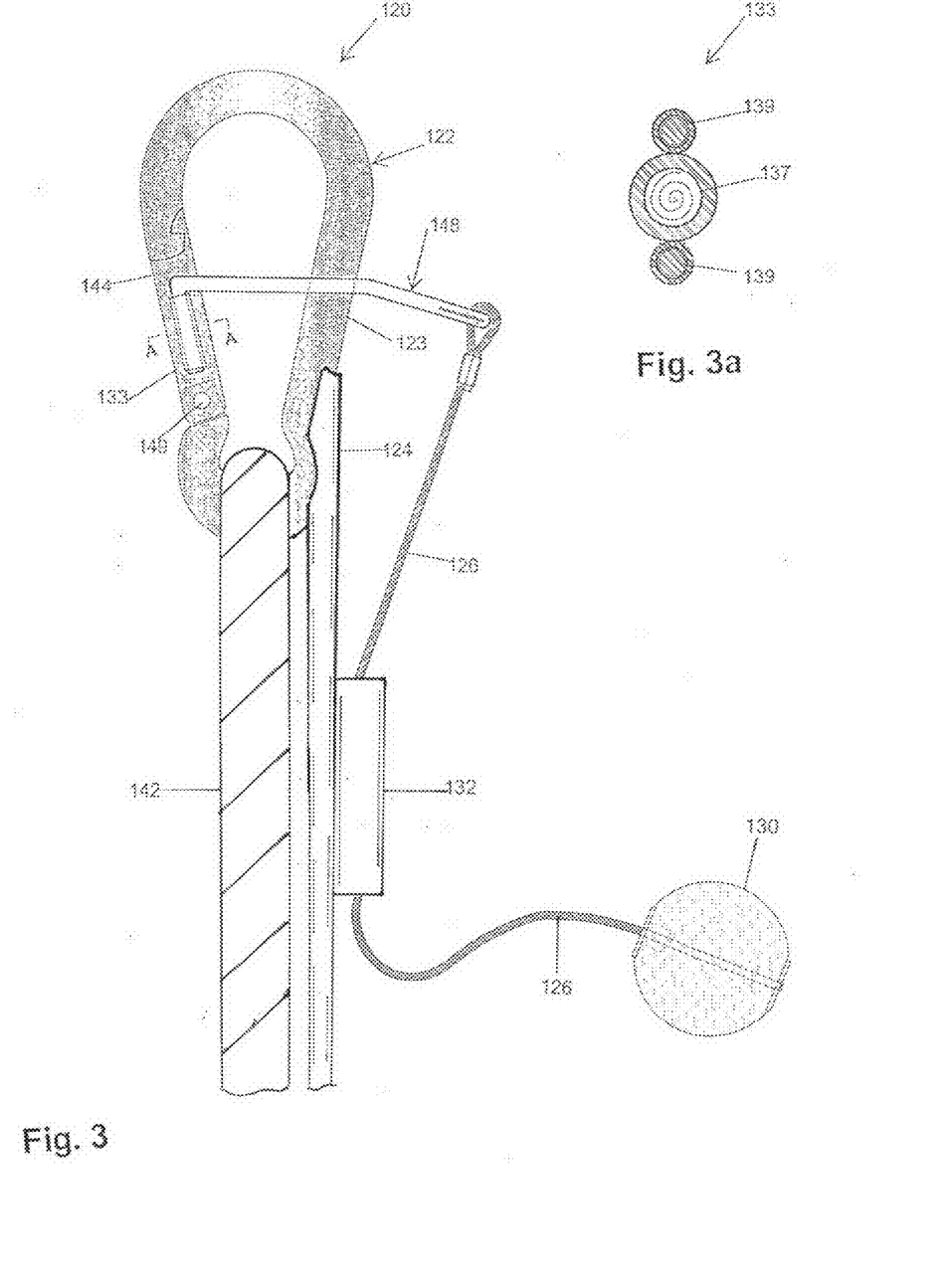
FIG. 3 is an elevational front view of the clip portion and an embodiment of a three sleeve attachment component for connecting the retractor lever of the invention.
FIG. 3a is a sectional view taken of the three-sleeve component taken along A-A of FIG. 3.
Figure 4A:
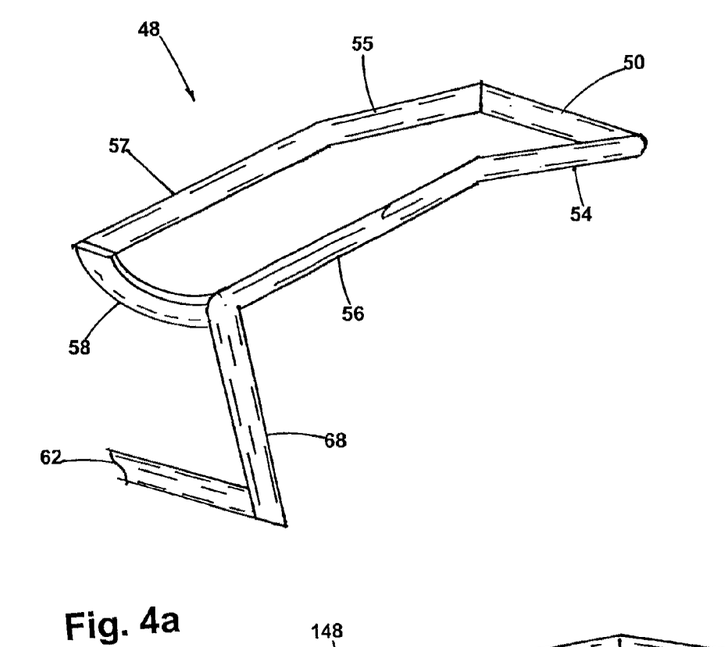
FIG. 4a is a top pictorial view of the functional retractor lever of the primary embodiment shown in FIGS. 1, 2, 2b and 2c.
Figure 4B:
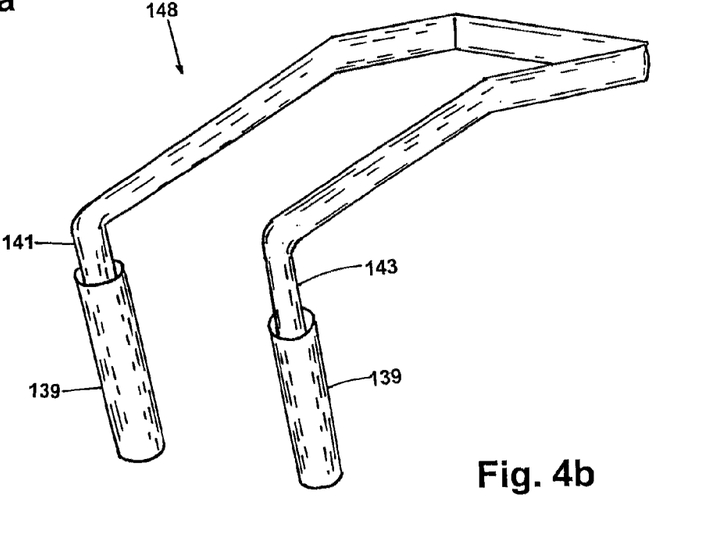

FIG. 3 depicts a mooring pendant apparatus 120 that illustrates an alternative system for securing a retractor lever 148 to activate a movable arm 144. Attaching a mooring line 142 to a ring section has been discussed above, but this embodiment allows for an attachment of the mooring line that can be easily controlled by an external rod 124 which is connected integrally at both the neck and ring sections 123, 138, of the clip. This attachment is generally done by welding but could also be cast as a single unit. Since the origination of the inner spring 149 within the clip 122 does not allow for the placement of holes in the movable arm 144, the retractor lever 148 is alternatively attached to the movable arm 144 by means of a three-sleeve component 133 which is friction fitted over the movable arm 144. A cross-section of the component 133 taken along line A-A of FIG. 3 is shown on FIG. 3*a*. In operation, the component 133 can be placed at any site of the movable arm 144, but preferably it is placed in parallel and at a lower section of the movable arm. This may be done for a variety of reasons, the most important being that if the attachment 133 became loose, it would still be functional. The attachment component 133 contains a large inner sleeve 137 which is slipped over for a friction fit with the movable arm 144. There are two adjacent smaller sleeves 139 connected to the larger sleeve 137 creating a single unit. These smaller sleeves 139 house the left and right legs 141, 143 of the retractor lever 148, best shown in FIG. 4*b*. FIGS. 4*a* and 4*b* depict the subtle change between the two retractor levers, 48 and 148. The angles of the sleeves 137, 139 are also maintained parallel to the movable arm 144. Conceivably, it is possible to have the sleeves further forward or further backward of the movable arm 144 and with minor alterations function nearly as well. Methods such as placing a bend at the bottom of the small sleeves or inserting a pin to keep the legs from slipping (although not shown) may be used. The angles created between the arm sections of the retractor lever 148 and the left and right legs 141, 143, of the retractor lever 148 are very abrupt, because this type of acute angle was found to reduce stress and create an effortless and maximum pull on the movable arm 144. This embodiment can be completed with an elongated cable guide 132 and a movable handle in the form of a pull ball 130. Not shown in this FIG. 4 is a fixed handle but that can be one of the plastic handles previously discussed or the mooring line 142 and external rod 124 can be gripped together.

Figure 5:
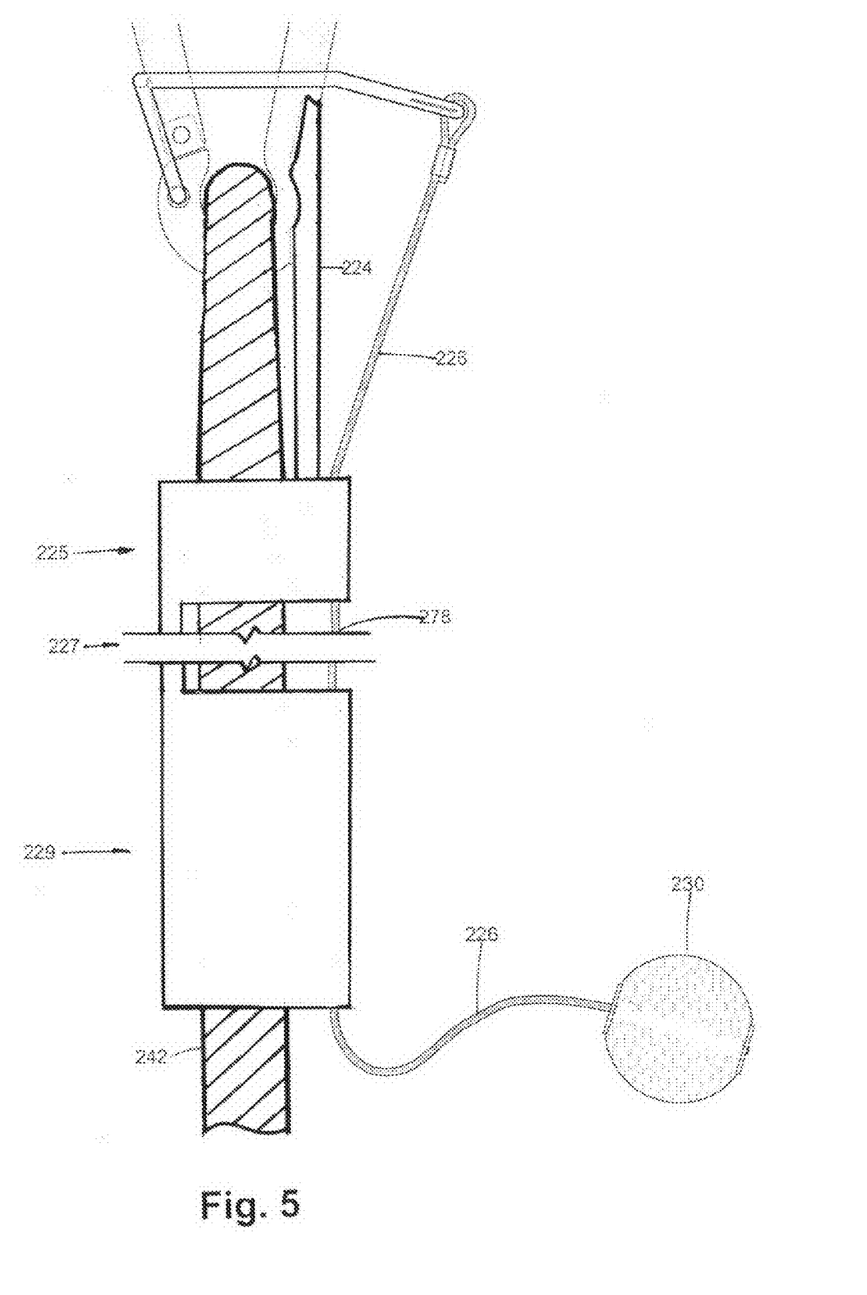
FIG. 5 is elevational view of an embodiment of the invention utilizing a triple function intermittent external rod system.

FIG. 5 describes an embodiment wherein a mooring pendant apparatus 220 utilizes an innovative intermittent triple function external rod system 224. The means for connecting the external rod 224 to the neck and clip sections 223, 222, are the same as shown in FIG. 3 and preferably welded therein. The actual mechanism in which the movable arm 244 is activated by the retractor lever 248 does not vary from the primary embodiment shown in FIGS. 1 and 2, therein this needs not to be re-iterated here. The innovative aspect of this embodiment lies in the concept of the intermittent triple function external rod 224 to control and activate the apparatus. The intermittent triple function external rod 224 starts on one side of the mooring line 242 and crosses over it when approaching a first stabilization section 225. In the first stabilization section 225 the cable 226 is contained in a channel 278 having inlet and outlet beveled edges. This first stabilization section 225 also rigidly stabilizes the mooring line 242. A connector section 227 provides for the connection between the first stabilization section 225 and a second stabilization section 229. The second stabilization section 229 also serves as a gripping handle. It is quickly apparent that the lengths of the three sections 225, 227, and 229 are indeterminant and will depend upon personal choice while keeping within constraints of weight and the ability to control, as this embodiment also is designed to be an extension of the boater's arm. Also shown in FIG. 5 is a pull ball 230 which is affixed to the cable 226 to ease the task of pulling on the cable. The pull ball 230 would be preferably made from a plastic or rubber material and convention methods can be used to attach it to the cable 226. Upon the clip 222 being secured to the bow ring of the boat or the mooring ring, the clip 222 is then closed by releasing tension on the cable 226. When returning to use the boat, the user grabs the ball 230, starts the initial pull wherein the clip 222 opens and the apparatus is free from the boat ring.

While it is apparent that the illustrative embodiments of the invention herein disclosed fulfill the objectives stated above, It will be appreciated that numerous modifications and other embodiments may be devised by those skilled in the art. Therefore, it will be understood that the appended claims are intended to cover all such modifications and embodiments which come within the spirit and scope of the present invention. It is anticipated that the apparatus has a variety of uses outside of watercraft uses.

What is claimed is:

1. A mooring pendant apparatus for use in docking a boat, wherein the apparatus releasably couples or decouples to an eyelet on the bow of the boat or to a buoy, the apparatus comprises:
  a clip including: a hook section integral with a ring section and having a mouth defined there between, and having an attachment hook; a movable arm having an upper bridge section which contains an internal spring that causes the movable arm to be biased into a closed position on the clip;
  a functional retractor lever comprising: a right arm section and a left arm section, each arm being bowed and having an angular deviation defined therein; an activating system that is in functional engagement with the movable arm; and, a looped section;
  a rod having means for connecting a first end to the clip;
  a cable having one end fastened to the looped section of the retractor arm;
  means for guiding and controlling the cable,
  wherein a boater may pull on the cable with a sufficient force to overcome, any biasing created by the internal spring, therein causing the clip to open, or subsequently closing by releasing the pull on the cable.

2. The apparatus of claim 1, wherein the rod is a central rod and has a second end containing a displaced eyelet for fastening of a mooring rope.

3. The apparatus of claim 2, wherein the clip, functional retractor arm, central rod and displaced eyelet are formed out of stainless steel or brass.

4. The apparatus of claim 2, wherein at least one of the clip, functional retractor arm, central rod or displaced eyelet are formed by casting.

5. The apparatus of claim 2, wherein at least one of the clip, functional retractor arm, central rod or displaced eyelet are formed by forging.

6. The apparatus of claim 2, wherein at least one of the clip, functional retractor arm, central rod or displaced eyelet are welded.

7. The apparatus of claim 1, wherein the cable is formed from aircraft cable or polyvinylchloride coated steel.

8. The apparatus of claim 2, wherein the activating system of the functional retractor arm comprises:
  the ring section having an access of rotation hole; and
  the functional retractor lever including a curved section in functional engagement with the movable arm and a leg section exending downwardly and having at a distal end an extension piece that frictionally fits with bias into the access of rotation hole to create a leveraged anchor for the retractor lever.

9. The apparatus of claim 8, wherein the means for guiding and controlling the cable comprises:
  a cable guide for maintaining control of the cable passing through it;
  a fixed handle attached to the central rod; and
  a movable handle attached in a sliding relationship to the central rod, and securely holding another end of the cable,
  wherein a boater may open the clip by pulling on the movable handle with sufficient force to overcome the spring tension of the movable arm.

10. The apparatus of claim 8, wherein the means for guiding and controlling the cable comprises:
  the rod being an intermittent triple function external rod having a first end integrally connected to both the hook and ring sections of the clip, the external rod having three intermittent sections, a first section acting as a cable guide for stabilizing both the mooring line and the cable, a third section acting as a fixed handle to stabilize the mooring line and the cable while providing a gripping handle for the boater, and a second section serving as a connector between the first section and a third section; and
  a movable handle consisting of a pull ball attached to the other end of the cable,
  wherein a boater may open the clip by pulling with sufficient force on the pull ball to overcome the spring tension of the movable arm.

11. The apparatus of claim 10, wherein the intermittent triple function external rod has a second end containing a displaced eyelet for fastening of a mooring rope.

12. The apparatus of claim 10, wherein the intermittent triple function external rod is cast and formed out of stainless steel or brass.

13. The apparatus of claim 10, wherein at least one of the clip, functional retractor arm, intermittent triple function external rod or displaced eyelet is forged and formed out of stainless steel or brass.

14. The apparatus of claim 10, wherein at least one of the clip, functional retractor arm, intermittent triple function external rod or displaced eyelet is welded and formed out of stainless steel or brass.

15. The apparatus of claim 1, wherein the activation system comprises:
  a three sleeved attachment for placement over the movable arm, the attachment having a large inner sleeve friction-fitted over the movable arm and two smaller sleeves integrally connected on opposing sides of the attachment; and
  a pair of right and left lower and upper arm sections, the lower and upper arms forming an angular deviation in relationship to each other, and the right and left sections maintaining a bowed position; a pair of leg section abruptly extending downward, each leg friction-fitted into one of the smaller sleeves of the attachment.

16. The apparatus of claim 15, wherein the means for guiding and controlling the cable comprises:
  the rod being an external rod having a first end connected to both, the hook and ring sections of the clip; and
  the cable extending through an elongated cable guide and having another end attached to a pull ball,
  wherein a boater may overcome the biased action of the movable arm by pulling on the pull ball with sufficient force.

17. The apparatus of claim 16, wherein the external rod has a second end containing a displaced eyelet for fastening of a mooring rope.

18. The apparatus of claim 15, wherein the three sleeve attachment is formed from a metal or a plastic.

19. The apparatus of claim 15, wherein at least one of the clip, functional retractor arm, external rod or displaced eyelet are formed by casting.

20. The apparatus of claim 15, wherein at least one of the clip, functional retractor arm, external rod or displaced eyelet are formed by forging.

21. The apparatus of claim 15, wherein at least one of the clip, functional retractor arm, external rod or displaced eyelet are welded.

* * * * *